United States Patent [19]

Unger et al.

[11] Patent Number: 4,784,709
[45] Date of Patent: Nov. 15, 1988

[54] SEAMLESS OVERPACK AND SPIN WELDING APPARATUS FOR MAKING SAME

[75] Inventors: Samuel L. Unger, Venice; Rodney W. Telles, Alhambra; Hyman R. Lubowitz, Palos Verdes Est., all of Calif.

[73] Assignee: Environmental Protection Polymers, Inc., Hawthorne, Calif.

[21] Appl. No.: 776,081

[22] Filed: Sep. 6, 1985

Related U.S. Application Data

[63] Continuation-in-part of Ser. No. 589,517, Mar. 14, 1984, abandoned.

[51] Int. Cl.$^4$ .......................... B29C 65/06; B65B 7/28
[52] U.S. Cl. ........................................ 156/69; 53/334; 53/485; 156/73.5; 156/580; 228/2
[58] Field of Search .................... 156/69, 73.5, 580; 228/2, 112, 113; 264/68; 53/485, 334

[56] References Cited

U.S. PATENT DOCUMENTS

| | | | |
|---|---|---|---|
| 3,269,002 | 8/1966 | Hollander et al. | 228/113 |
| 3,316,135 | 4/1967 | Brown et al. | 156/580 |
| 3,446,688 | 5/1969 | Flax | 156/69 |
| 3,954,215 | 5/1976 | Takagi et al. | 228/2 |
| 4,090,898 | 5/1978 | Tuskos | 156/73.5 |
| 4,140,569 | 2/1979 | Yealy | 156/73.5 |
| 4,353,775 | 10/1982 | Paul | 156/580 |
| 4,411,726 | 10/1983 | Woerz et al. | 156/69 |
| 4,470,868 | 9/1984 | MacLaughlin et al. | 228/2 |

*Primary Examiner*—Michael Wityshyn
*Attorney, Agent, or Firm*—Donald G. Lewis

[57] ABSTRACT

A spin welding apparatus is employed for hermetically sealing seamless overpacks. The seamless overpacks are utilized, for example, for isolating corroding 55 gallon drums which contain hazardous materials. The overpacks include a receiver which contains the 55 gallon drum and a cover which is spin welded onto the receiver. The receiver and cover have circular welding surfaces which oppose one cover which is spin welded onto the receiver. The receiver and cover have circular welding surfaces which oppose one another across a horizontal plane. The welding surfaces have a composition of heat fusible plastic. During the spin welding process, the cover is rotationally driven by the spin welding apparatus while simultaneously being forced downward onto the receiver, which is held stationary. Frictional heat melts the opposing welding surfaces. After the rotational motion stops, the opposing welding surfaces cool and solidify to form a seamless weld joint. During the spin welding process, the covers are rendered susceptible to centrifugal imbalance due their large size. The resultant centrifugal imbalance can couple to other components of the system. Several features serve to ameliorate this centrifugal imbalance: vibrational coupling between the receiver from the cover is minimized by the horizontal configuration of the welding surfaces; rotational imbalance transmitted to the drive shaft is damped by pillow blocks; the damping efficiency of the pillow blocks is enhanced by mounting the pillow blocks and the torque driver onto a linear positioning table for effecting the axial movements of the drive shaft.

6 Claims, 2 Drawing Sheets

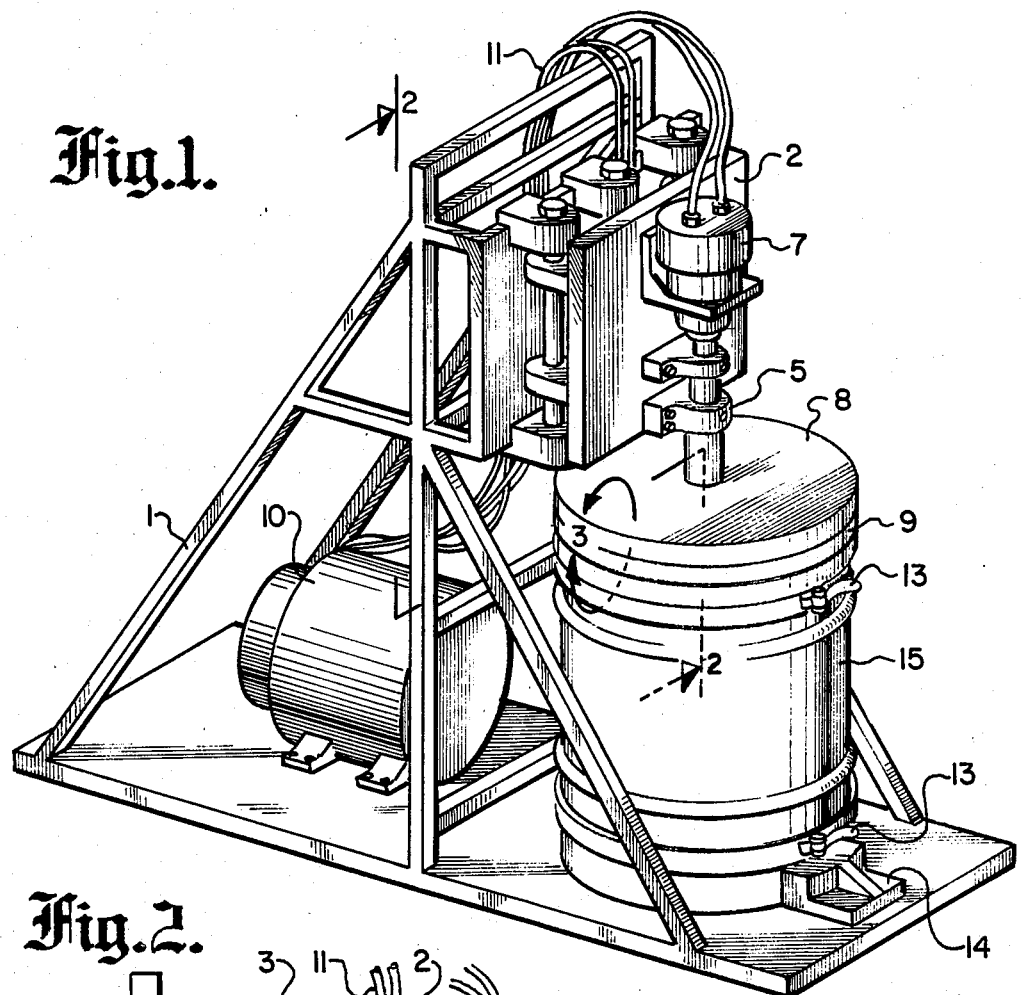
Fig.1.
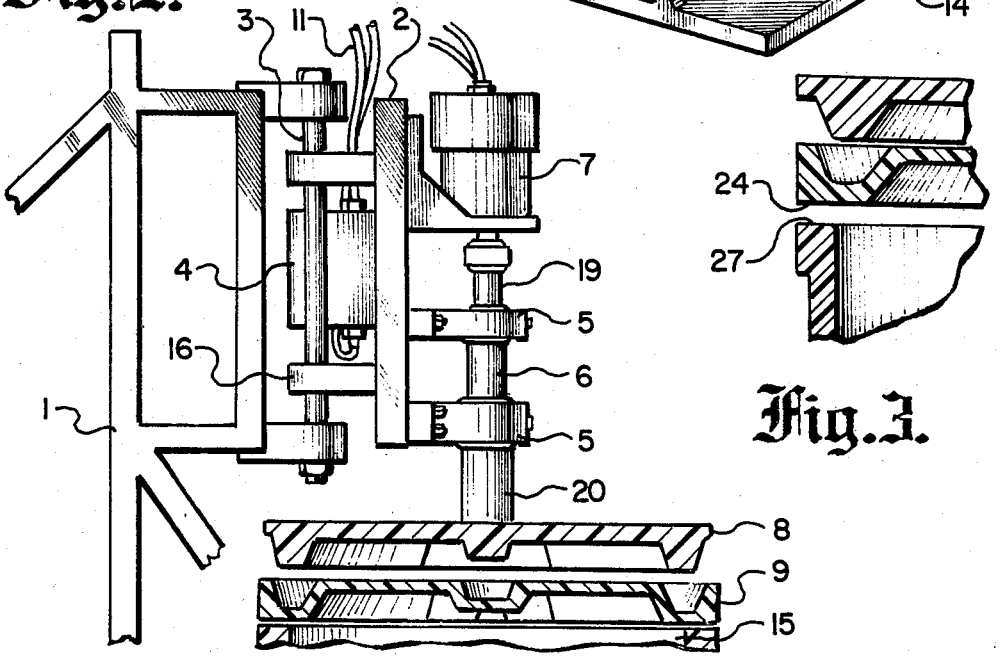
Fig.2.
Fig.3.

SEAMLESS OVERPACK AND SPIN WELDING APPARATUS FOR MAKING SAME

This is a continuation-in-part of co-pending application Ser. No. 589,517 filed on 03/14/84, now abandoned.

BACKGROUND

The invention relates to friction welding methods and articles made by such methods. More particularly, the invention relates to methods for spin welding a plastic piece having a susceptibility to centrifugal imbalance, to the spin welding devices for practicing such methods, and to certain novel articles which can be produced by such methods, viz. seamless overpacks.

An important application of the present invention includes a novel spin welding apparatus and spin welding method for making novel plastic overpacks for use in the ultimate disposal, transportation and storage of industrial wastes that may cause harm to man and the environment. One important such application of the invention involves overpacks designed specifically to encapsulate 55-gallon steel drums by the spin welding apparatus and method of this invention, thus providing the means to stabilize corroding drums that are or would be leaking toxic wastes. Such drums populate public dumps and uncontrolled disposal sites in the United States as well as the premises of industrial operations and present a serious health hazard. Additional applications of the inventions address other objectives in waste management, such as the transportation, temporary storage, and ultimate disposal of unconfined toxic substances and contaminated soils. Such materials can arise from waste treatment processes and accidental release of hazardous materials. Some pollutants should be stabilized by solification in situ prior to sealing the overpack. In such cases, the contaminants would be secured by encapsulation employing the plastic overpacks and the friction welding apparatus of this invention.

Spin welding is a method for welding together two heat fusible plastic pieces. During the spin welding process, one heat fusible plastic piece is rotated at a specified speed while contacting the second piece at a specified pressure. Frictional heat is generated by the combination of contact pressure and spinning motion. As the spinning process continues, frictional heat raises the temperature of the heat fusible plastic until melting occurs. The continued application of presure causes continued melting and mixing of the heat fusible plastic. The continued application of pressure and the continued molting process will result in the formation of flash thrown from the rotating piece after the contact space between the two pieces becomes filled with the melt material.

After the contact space becomes filled with melt material, the spinning process can be stopped. After the spinning process stops, the melted heat fusible plastic is allowed to cool and to cure. Contact pressure between the two pieces is continued during this curing process. During the curing process, the melted heat fusible plastic solidifies and forms a weld between the first piece and the second piece. The weld is seamless in that the melt material from both pieces was mixed during the spinning process so as to form a gradient between the two pieces. Also, the weld is seamless because there is no air in the contact space containing the melt material. The melted heat fusible plastic within the contact space cures as one seamless unit, i.e. the melted plastic cools and solidifies as one unit seamlessly spanning across the two pieces and filling the contact area between the two pieces so as to join the two pieces without discontinuity.

An early review of basic spin welding technology was provided by Alex S. Neumann and Frank J. Bockhoff in their publication entitled, *Welding of Plastics*, pages 99-109 (Chapter 6—Friction Welding), Reinhold Co., N.Y., 1959. A somewhat later article, written by Robert M. Stemmler, *Plastics Technology*, pages 42-43, 1963, provides further information on the practice of spin welding methods. Both Neumann and Stemmler provide operable ranges for rotational speeds and contact pressures for obtaining a successful spin weld using small pieces having various thermoplastic compositions. Both Neumann and Stemmler taught that the spin welding process can generate sufficient heat to melt a particular heat fusible plastic for a successful weld only within these operable ranges. These operable ranges provided a lower limit for the rotational speed and contact pressure which can be used in a spin welding process.

A common type of spin welding device uses a drive shaft to which the rotated work piece is concentrically attached. Examples of such spin welding devices are given by Birkhold (U.S. Pat. No. 3,993,519) and Flax (U.S. Pat. No. 3,446,688). Even at the lowest range of rotational speed and pressure taught by Neumann and Stemmler, large work pieces can quickly become centrifugally unstable when concentrically attached to drive shaft. The prior art for such devices merely accepted these centrifugal imbalances and thereby imposed a practical limit on the size of the work piece. Spin welding large work pieces with such devices was precluded by the operating ranges taught by Neumann and Stemmler and by the susceptibility to centrifugal imbalance inherent to such large work pieces within these ranges. The present invention enables the use of large work pieces in a spin welding process using a drive shaft for concentrically driving the work piece.

Centrifugal imbalance can arise in a work piece from at least three possible sources: (a.) asymmetrical distribution of mass about an axis of rotation, (b.) mismatch between the axis of symmetry of the work piece and the axis of the drive shaft, and (c.) asymmetrical contact between the first piece and the second piece. In most cases, for a given geometry, the centrifugal imbalance of a work piece increases approximately with the square of the radius of the work piece.

To a degree, the susceptibility to centrifugal imbalance can be minimized for a given application by finely balancing and accurately centering the work pieces and by carefully leveling or matching the welding surfaces of each work piece. Minimizing the susceptibility to centrifugal imbalance enlarges the size limit for work pieces which can be spin welded. To a degree, such precautions are in fact taught and practiced by the prior art. However, the difficulty of implementing such precautions increases with the size of the work piece so that there are practical and commercial limits to the precautions which can be taken for increasing the size of the work piece. The practical size limit for the radius of a work piece used in prior art concentrically driven spin welding processes is estimated to be approximately four inches. Work pieces used in peripherally driven and supported spin welding methods may exceed this limit (discussed infra). The present invention teaches how to exceed this size limit using a concentrically driven spin welding processes.

Paolini (U.K. Pat. No. 1,460,752) describes one approach for spin welding large diameter pieces (pipes). Paolini uses an intermediate member to join two larger members. The intermediate member is rotated and supported within a cradle and driven at its perimeter. In the Paolini device, there is no drive shaft concentrically connected to the work piece to suffer the large moments generated by an imbalanced work piece. In the Paolini device, the vibrational energy generated by driving a centrifugally imbalanced intermediate member is dissipated by the cradle at the perimeter of the device. The configuration of the Paolini device directs the burden of supporting a centrifugally imbalanced work piece to support members at the perimeter of the work piece. Such forces are more easily handled at the perimeter than at the center. However, the Paolini method teaches only spin welding where the axis of rotation for the work piece lies in the horizontal plane. The present invention teaches that it is preferred that the work piece be rotated about a vertical axis during the welding process. Indeed, a chief product of the present invention requires that the work piece be rotated around a vertical axis.

The spin welding apparatus of the present invention uses pillow blocks to control the contact between the welding surfaces of the work pieces. The present invention uses a drive shaft to which one work piece is concentrically mounted and driven. The pillow blocks serve to damp vibrations occurring in the drive shaft caused by the centrifugal imbalance of a work piece. However, the chief purpos of the pillow blocks in the present invention differs from applications for pillow blocks found in the prior art.

In the prior art, pillow blocks were commonly used to damp vibrations so as to protect precision bearing surfaces supporting the drive shaft and to protect train elements connecting with the drive shaft. In the present invention, the pillow blocks are put to a novel use. In the present invention the pillow blocks serve to maintain the rotational concentricity of the rotating work piece so as to maximize its effective contact with the welding surface of the stationary work piece and so as to maximize the generation of frictional heat between the two welding surfaces. In the prior art, pillow blocks were used to minimize wear and frictional heat; in the present invention, the pillow blocks are used to maximize the generation of frictional heat and to accelerate the onset of melting.

The spin welding device of this invention enables the fabrication of seamless overpacks having a heat fusible plastic composition. A seamless overpack is a hermetically sealed container which lacks any seams. A seam is a joint between two abutting materials in which there is line discontinuity or other discontinuity which separates the two materials. A joint between two heat fusible plastic pieces which is properly formed by a spin welding process is said to be seamless. In a spin welding process, the spinning motion mixes the melted heat fusible plastic material within the contact space between the two pieces. Upon curing, there is a continous distribution gradient across the weld such that there is no line of discontinuity which separates the two materials. Although spin welding produces a macroscope weld line, close examination and testing reveals that the macroscope weld line is in fact seamless. Seamless welds are much stronger than welds having a seam.

The method for making the seamless overpacks of this invention includes and is dependent upon the spin welding method of this invention. Seamless overpacks having a heat fusible plastic composition are not found in the prior art. However, non-hermetically sealed containers having a heat fusible plastic composition and having a seamless spin welded joint are found in the prior art. These various containers are not hermetically sealed for a variety of reasons. One such example is a tubular container, of the type for tooth paste, described by Flax (supra). A second such example is a container, of the type for containing yogurt, described in a patent held by the Koehring Company (U.K. Pat. No. 1,316,151). Although both of these examples describe a spin welded joint, neither example is hermetically sealed. Both containers have an opening and include some type of detachable lid or screw top for covering and sealing the opening. Indeed, this opening is an essential element of these containers for at least three reasons: (a.) Since the seamless weld of these containers is made prior to filling the container, the opening is necessary to fill the container. (b.) If the methods described for spin welding these containers were used on a container containing its intented content, the content would spill from the container during the spin welding process. (c.) Facile means for opening and closing these containers is necessary to provide the consumer with convenient access to its content. Although these containers include a seamless weld, they are not hermetically sealed. The spin welded overpacks described in the present invention include hermetically sealed overpacks lacking an opening for accessing its content. The seamless overpacks of the present invention utilize the enhanced strength and intregrity of a seamless spin weld for hermetically sealing a large diameter opening for loading the overpack. The seamless overpacks of the present invention include overpacks which are sealed by the spin welding method while holding their enclosed content.

In the prior art, hermetically sealed containers have been made from materials other than heat fusible plastics. Hermetically sealed glass vials were known and used since at least the Renaissance period. Hermetically sealed lead containers were also known anciently. Both types of containers are hermetically sealed by fusing the glass or lead respectively with heat so as to form a seamless seal. Both types of hermetically sealed containers continue to find limited applications today. Due to the relatively high cost of these containers, the volume of the isolate is typically rather small and the value of the isolate is typically rather precious. The heat fusible plastic seamless overpacks of the present invention are used for inexpensively containing relatively large volumes of isolate. The initial application which stimulated the present invention involved the problem of isolating waste material contained by 55 gallon steel drums, where the continued integrity of the drum was suspect. The minimun radius for the aperture of such overpacks needs to be approximately 13 inches to accomodate these 55 gallon drums. Heat fusible plastic seamless overpacks are unknown in the prior art There is no practical method taught by the prior art which could be applied to the problem of making wide mouth heat fusible plastic seamless overpacks having a strong seamless weld. Paolini (supra) teaches a spin welding method for joining two large diameter pieces of heat fusible plastic pipe with an intermediate member. However, it would be impractical to use Paolini's spin welding method for joining pipe so as to make overpacks. Paolini's method requires that the pipe lie horizontally. In the principal application for overpacks, it is undesirable to lie the 55 gallon drum on its side during the spin welding process. The typical isolate for an overpack is chemical waste material stored within a steel drum having suspect integrity. Lying the drum on its side within the overpack during the spin welding process could cause the drum to leak or spill. If the chemical waste is flammable, leaked waste material could catch fire due to the heat generated by the spin welding process. Paolini's spin welding would also be impractical for making overpacks because the method requires that two opposing horizontal pipe members abut the intermediate member with equal force. If two overpacks were substituted for the two opposing pipe members, the end product would be a double overpack joined by the intermediate member. Such a double overpack would be undesirable for a variety of reasons. It would be unwieldy; it would risk mixing the two enclosed waste materials; it would preclude the overpacking of a single drum and; it would preclude different storage handling of the two isolates. Although Paolini taught how to spin weld large pieces, he did not teach how to make a seamless overpack. Paolini's spin welding method is impractical for that purpose.

SUMMARY OF THE INVENTION

The present invention includes a spin welding apparatus, a spin welding method, and spin welded seamless overpacks and encapsulators produced by this apparatus and method. The spin welding apparatus and method are of the type which use a drive shaft for concentrically driving a work piece. The spin welding apparatus and method advance the prior art by enabling the welding of large work pieces and other work pieces having a susceptibility to centrifugal imbalance arising from a variety of causes. The spin welding apparatus and method include means for maintaining the concentricity of the work piece about its axis of rotation during the spin welding process. Unless centrifugal imbalance is avoided or suppressed, the rotational path of the welding surface of a large work piece can be irregular. A centrifugally imbalanced work piece results in a poor quality weld and can damage the apparatus. The spin welding apparatus and method include means for damping vibration of the drive shaft and for suppressing vibration of the work piece. Damping the vibration of the work piece enables the spin welding method to be applied to large diameter pieces having a susceptibility to centrifugal imbalance.

The spin welding apparatus and method utilize pillow blocks to damp vibration in the drive shaft. The drive shaft has one or more journals which are born by the pillow blocks. The pillow blocks are anchored to a linear positioning table and are interposed between the work piece and a torque means which turns the drive shaft. The number of pillow blocks employed will depend upon the anticipated vibrational load. The pillow blocks absorb some vibrational energy and transfer the remainder to the linear positioning table. The linear positioning table is attached to the frame and is designed to receive a vibrational load.

The spin welding apparatus and method include a platen at the lower end of the drive shaft for connecting with the work piece. The connection between the platen and the work piece serves to rotationally and translationally drive the work piece. In the present invention, the platen also serves to concentrically center the work piece, to suppress subharmonic vibrations within the work piece, and to apply pressure at the perimeter of the work piece above the welding surface. In a preferred embodiment of the invention, the platen and the work piece have a "template fit." The surface configuration of the platen spans the top side of the work piece and includes a "template fit". The template fit is designed to assure that the connection between the platen and the work piece is concentric, i.e. centered on the axis of rotation of the work piece. Also, the template fit spans the top side of the work piece so that the contact with the platen serves as a barrier to subharmonic vibrations within the work piece during rotation. The platen extends its contact to the perimeter of the work piece or to its proximity so as to bear down directly above the welding surfaces during the spin welding phase of the method.

The invention also includes seamless overpacks and spin welded encapsulators produced by this spin welding apparatus and method. The seamless overpacks and spin welded encapsulators serve to hermetically seal their content. The seamless overpacks and spin welded encapsulators of this invention include overpacks and encapsulators having an aperture too large to be spin welded by prior art methods. One embodiment of the seamless overpacks includes an aperture which can receive a standard 55 gallon steel drum. However, there are a variety of other applications for spin welded seamless overpacks and encapsulators having wide mouth apertures.

The distinction between a seamless overpack and a spin welded encapsulator is slight. Overpacks are designed to supply a second layer of containment, e.g. a plastic overpack may contain a 55 gallon drum which contains waste material; encapsulators are designed to contain their isolate directly. If the isolate of the encapsulator is flowable, it may be useful to include an access port to the encapsulator. There are applications requiring an encapsulator having both a facility for bulk loading of material and a facility for sampling small quantities. Although an encapsulator with an access port is no longer hermetic, a very small access port can provide sealing properties much superior to large access ports. A wide mouth encapsulator sealed by the spin welding process of this invention and having a small access port with good sealing properties has near-hermetic containment and a facility for bulk loading. Such a combination is unknown in the prior art for containment devices.

One of the objects of the present invention is to provide a spin welding method and apparatus which uses a drive shaft for concentrically rotating the work piece and which can spin weld large heat fusible plastic pieces or other plastic pieces having a susceptibility to centrifugal imbalance.

Another object of the present invention is to provide a spin welding method and apparatus which uses pillow blocks for damping vibrations in a drive shaft concentrically connected to the work piece.

Another object of the present invention is to provide a spin welding method and apparatus which uses a platen which connects with the work piece in a manner which tends to assure that the axis of rotation of the platen is concentric with an axis of rotational symmetry of the work piece, e.g. by means of a template fit.

Another object of the present invention is to provide a spin welding method and apparatus which uses a platen which connects with a large work piece in a manner which spans and contacts the top surface of the work piece so as to act as a barrier to subharmonic vibratory modes within portions of the work piece, e.g. by means of a template fit.

Another object of the present invention is to provide a spin welding method and apparatus which uses a platen which connects with the work piece in a manner which contacts the work piece at or near its perimeter so as to provide a downward force upon a welding surface at or near the perimeter of the work piece.

Another object of the present invention is to provide a seamless overpack with an aperture which is sealed by means of a spin welding process for hermetically containing a second container and its isolate therein.

Another object of the present invention is to provide a seamless overpack having a wide mouth aperture for receiving bulk material and which is hermetically sealed by means of a spin welding process.

Another object of the present invention is to provide a seamless overpack having a wide mouth aperture for receiving bulk material and which is hermetically sealed with a large or centrifugally imbalanced cover by means of a spin welding process.

Another object of the present invention is to provide a seamless overpack having an aperture which is hermetically sealed by means of a spin welding process with a cover having means for coupling to a platen.

Another object of the present invention is to provide a seamless overpack having an aperture which is hermetically sealed by means of a spin welding process with a cover having means for coupling to a platen so as to tend to assure that the axis of rotation of the platen is concentric with an axis of rotational symmetry of the work piece, e.g. by means of a template fit.

Another object of the present invention is to provide a seamless overpack having an aperture which is hermetically sealed by means of a spin welding process with a cover having means for coupling to a platen in a manner which spans and contacts the platen so as to act as a barrier to subharmonic vibratory modes within subportions of the work piece itself, e.g. by means of a template fit.

Another object of the present invention is to provide a seamless overpack having an aperture and a first welding surface surrounding the aperture which is hermetically sealed by means of a spin welding process with a cover having a second welding surface at or near its perimeter, the two welding surfaces being substantially superimposable and being spin welded after loading with an isolate so as to provide the hermetic seal.

Another object of the present invention is to provide a spin welded encapsulator with an aperture which is sealed by means of a spin welding process for hermetically containing an isolate therein.

Another object of the present invention is to provide a spin welded encapsulator with an aperture which is sealed by means of a spin welding process and a small well sealed access port for near-hermetically containing an isolate therein.

Another object is to provide plastic overpacks of appropriate size and dimensions to hold 55-gallon steel drums with hazardous contents.

Other objects of this invention include the following provisions an properties for seamless overpacks and spin welded encapsulators:

1. Overpacks and encapsulators having sufficient strength to withstand their manipulation and transportation by common carrier, and to be sequestered in temporary storage or to be disposed of in an ultimate disposal site such as a landfill.
2. Overpacks and encapsulators having a composition compatible with hazardous materials.
3. Overpacks and encapsulators having resistance to environmental stresses of a landfill.
4. Overpacks and encapsulators having resistance to the action of aggressive leaching waters, and freeze-thaw and wet-dry conditions.
5. Overpacks and encapsulators for holding hazardous materials that are unsafe to expose to the atmosphere.
6. Overpacks and encapsulators which are stable to sun-light.
7. Overpacks and encapsulators for holding hazardous materials that can be incinerated with none or nil amounts of ash upon incineration.
8. Overpacks and encapsulators having a welded seal that is as strong or stronger than the strength of the walls of the overpack or encapsulator.
9. Overpacks and encapsulators hermetically sealable in a short period of time.
10. Overpacks and encapsulators having large openings which are hermetically sealable.
11. Overpacks and encapsulators sealable without exposure of the members of the joint to the atmosphere.
12. Overpacks and encapsulators loadable and sealable at remote disposal sites for clearing contaminated wastes.
13. Overpacks and encapsulators for stabilizing waste materials by in situ solidification prior to sealing.

Additional objects and advantages of this invention will be set forth in part in the description which follows and in part will be obvious from the description, or may be learned by practice of the invention. The objects and advantages of the invention may be realized and attained by means of the instruments abilities and combinations particularly pointed out in the appended claims.

BRIEF DESCRIPTION OF THE DRAWINGS

FIG. 1 is a perspective view illustrating a vibrationally damped spin welding apparatus and the unassembled components of a seamless overpack operationally positioned on the vibrationally damped spin welding apparatus.

FIG. 2 includes a sectional view of FIG. 1 illustrating the frame, the linear positioning table, and the platen of the spin welding apparatus illustrating the cover and a fragment of the receiver of the seamless overpack, and indicating the relative orientation of the platen, the cover, and the receiver prior to commencing the spin welding process; FIG. 2 also includes an elevational view of the drive shaft, the torque supplying means, the means for slidably hanging the table, and the means for driving the table of the spin welding apparatus.

FIG. 3 is a sectional view of a fragment from FIG. 1, slightly enlarged and exploded, illustrating the platen, the cover, and the receiver.

FIG. 4 also uses phantom lines to indicate the structure of the under side of the platen.

FIG. 5A is an exploded view of the receiver, the cover, and the platen with an attached fragment of the drive shaft; FIG. 5A shows the top side of the cover which mates with the under side of the platen in FIG. 5B; FIG. 5A also shows the aperture, the welding surface, and a portion of the chamber of the receiver.

FIG. 5B shows the rotating step of the spin welding method where the cover is rotated by contacting the welding surface of the receiver under an applied pressure for causing the welding surfaces to fuse and mix.

FIG. 5C shows the curing step of the spin welding method where the cover is held motionless while the contact pressure with the receiver continues until the welding surfaces, fused by the rotating step, become sufficiently cooled so as to form a seamless joint between the cover and the receiver.

DETAILED DESCRIPTION

Vibrationally Damped Spin Welding Apparatus

Figure 4:
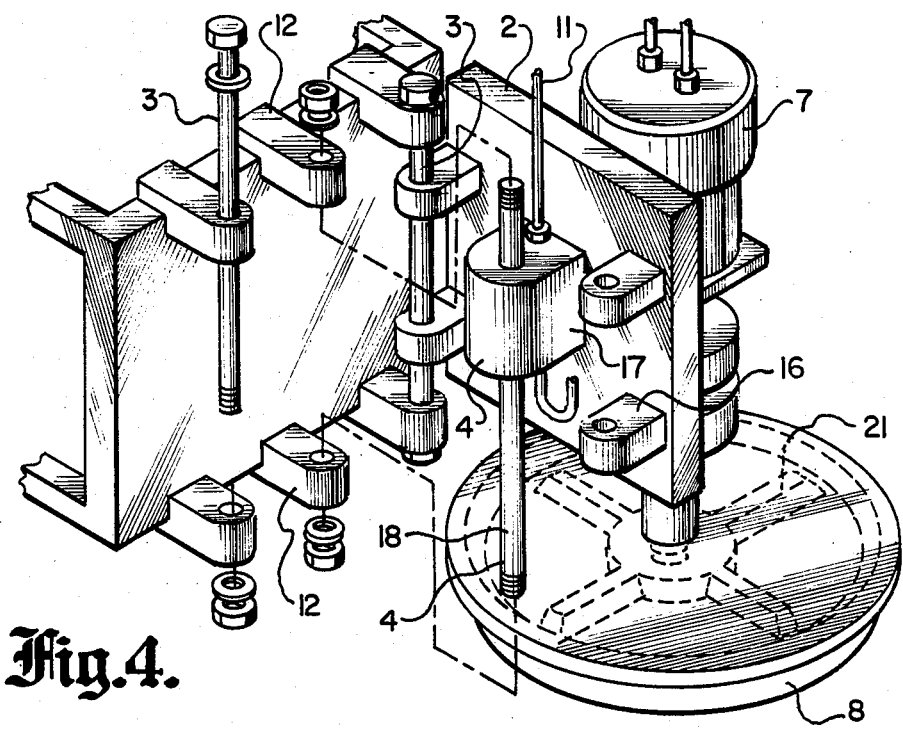
FIG. 4 is an alternative perspective view of the vibrationally damped spin welding apparatus of FIG. 1 showing the vibrationally damped spin welding apparatus in partially disassembled state so as to illustrate the means for slidably hanging the table, and the means for driving the slidably hung table.

A preferred embodiment of the vibrationally damped spin welding apparatus is designed for making seamless overpacks for 55 gallon steel drums. It is preferred that this apparatus be field operable for encapsulating drums in the field and that it have provisions for transportation by truck or railcar. Such a vibrationally damped spin welding apparatus would include the following elements: a frame (1), a linear positioning table (2), means for slidably hanging (3) the linear positioning table (2) vertically onto the frame (1), means for driving (4) the linear positioning table (2) along the hanging means (3) a pillow block (5) attached to the table (2), a drive shaft (6), means for supplying torque (7) to the drive shaft (6), and a platen (8) concentrically attached to the drive shaft (6) for coupling with the cover (9) of the overpack The frame (1) provides ultimate support for all of the working elements of the vibrationally damped spin welding apparatus. The frame (1) is designed for facile transportation by truck or railcar into the field. The frame (1) may house a power unit (10) for powering both the driving means (4) and the torque means (7). FIG. 1 indicates a hydraulic power unit (10) serving as the power unit and indicates hydraulic lines (11) feeding from the hydraulic power unit (10) to both the driving means (4) and the rotating means.

The frame (1) also supports the hanging means (3) for slidably hanging the linear positioning table (2) vertically onto the frame (1). FIG. 4 illustrates a partially disassembled view of the hanging means (3), including its attachment to the frame (1). The attachment between the frame (1) and the hanging means (3) should be capable of withstanding vibration generated by the spin welding process and carried to the hanging means (3). The hanging means (3) illustrated in FIG. 4 includes hanging rods (3) mounted vertically onto the frame (1).

The frame (1) also supports the driving means (4). The attachment (12) between the driving means (4) and the frame (1) is also indicated in the partially disassembled view of FIG. 4. The frame (1) may also include means for holding (13 & 14) the receiver (15) stationary during the spin welding process. FIG. 1 illustrates clamshell clamps (13) and a brace (14) which are connected to the frame (1) and which serve as holding means (13 & 14) for aligning and securing the receiver (15) during the spin welding process. The frame (1) may also provide a platform (not illustrated) so that overpacks can be loaded onto and removed from the apparatus by conventional equipment such as a forklift or drum hoist. The frame (1) can also be pallet mounted (not illustrated) so that the apparatus can be moved to different locations on-site by forklift. The frame (1) may also include an electric junction box (not illustrated) from which the power unit (10), the drive means and the rotating means may be controlled. The frame (1) may be welded from 2 inch structural steel and ½ inch thick deckplate. Typical frame (1) dimensions for this particular preferred embodiment include 120 inches length, 48 inches width, and 82 inches height.

The linear positioning table (2) is connected to the frame (1) via a slidable attachment (16) to the hanging means (3). FIG. 4 illustrates a partially disassembled view of the slidable attachment (16) between the table (2) and the rods (3) which serve as the hanging means (3). The slidable attachment (16) between the table (2) and the rods (3) should be capable of withstanding vibration generated by the spin welding process and carried to the table (2). The slidable attachment (16) between the table (2) and the hanging means (3) enables the table (2) to move in a vertical direction so as to advance and retract the table (2). FIG. 4 also illustrates the connection (17) between driving means (4) and the table (2). In this instance, the drive means includes a drive rod (18) vertically mounted onto the frame (1). The drive rod (18) includes a concentrically mounted hydraulic piston which is slidably mounted in a hydraulic cylinder (17). Hydraulic lines (11) lead from the hydraulic power unit (10) to the hydraulic cylinder (17) for activating the driving means (4). Activating the driving means (4) causes the table (2) to slide vertically along its hanging means (3) for advancing and retracting the table (2).

FIG. 2 illustrates the attachment between the table (2) and the torque means (7) and between the table (2) and two sets of pillow blocks (5). The torque means (7) and the pillow blocks (5) are aligned by these attachments so as to support the drive shaft (6) in a vertical position. The upper end (19) of the drive shaft (6) is connected to the torque means (7). The drive shaft (6) may include one or more journals by which the drive shaft (6) is to be vibrationally damped by the pillow blocks (5). The attachments between the table (2) and both the torque means (7) and the pillow blocks (5) should be capable of withstanding vibration generated by the spin welding process and carried to the torque means (7) and pillow blocks (5) respectively. FIG. 2 indicates that this preferred embodiment includes two pillow blocks (5) for the selected application of making seamless overpacks for 55 gallon drums. However, one pillow block may suffice for less demanding applications; more than two pillow blocks (5) may be required for more demanding applications. The torque means (7) serves to rotate the drive shaft (6). FIG. 2 indicates a hydraulic motor serving as the torque neans (7). Hydraulic lines (11) feed from the hydraulic power unit (10) to the hydraulic motor for rotationally driving the drive shaft (6). The hydraulic motor may be controlled remotely during the spin welding process.

Figure 5:
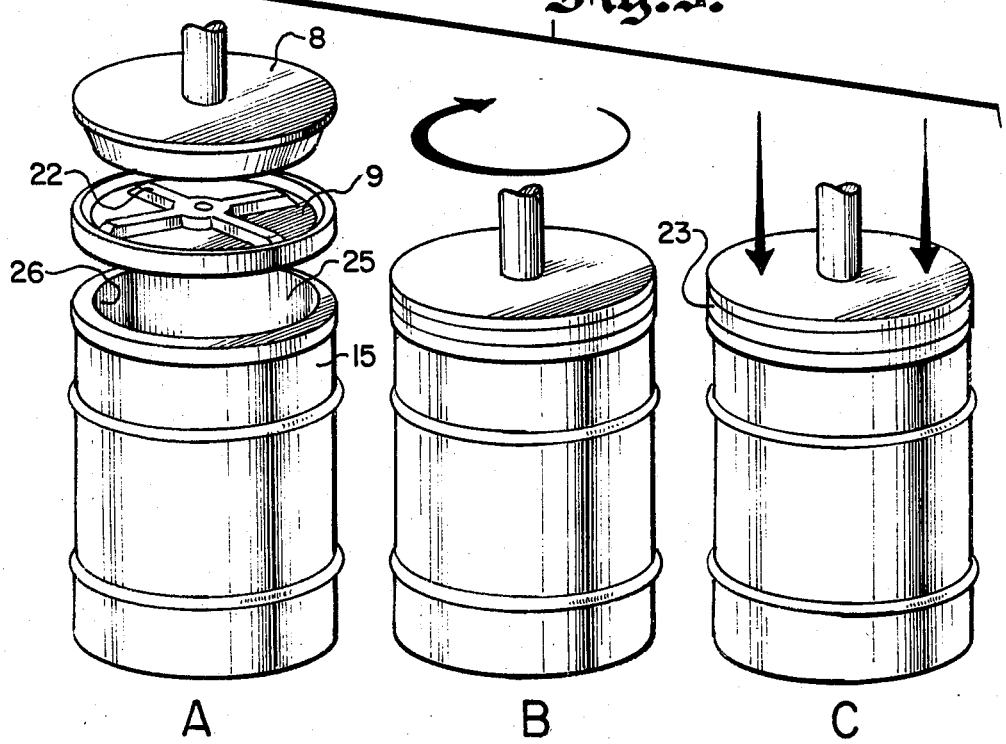
FIGS. 5A, 5B, and 5C are perspective views illustrating the sequenc of the spin welding method.

The lower end (20) of the drive shaft (6) is concentrically connected to the platen (8). The platen (8) includes a means for connecting (21) to the coupling means (22) of the cover (9). This connecting means (21) may be accomplished by any of a variety of methods. FIG. 2 illustrates that this preferred embodiment incudes a "template fit" between the platen (8) and the cover (9). One side of the "template fit" constitutes the connecting means (21) and the other side of the "template fit" constitutes the coupling means (22). FIG. 5A indicates rib structures (22) serving as the coupling means (22) of the cover (9). FIG. 4 indicates "rib receptors" serving the connecting means (21) of the platen (8). The connection between the platen (8) and the cover (9) is concentric with the drive shaft (6). The connecting means (21) enables the platen (8) to transmit torque and pressure from the platen (8) to the cover (9). During the spin welding process, the drive means advances the table (2) and the entire drive shaft (6) assembly so as to cause the platen (8) to drive the cover (9) under pressure against the receiver (15). During the spin welding process, the platen (8) transmits torque from the torque means (7) to the cover (9) and transmits pressure from the drive means to the cover (9) so as to generate frictional heat. During the spin welding process, vibrations may occur due to a susceptibility to centrifugal imbalance by the cover (9) during rotation. The pillow blocks (5) reduce such vibrations and stabilize the assembly.

A hydraulic power unit (10) may provide the two power requirements of the vibrationally damped spin welding apparatus, viz. rotation of the cover (9) and application of the welding pressure. In one preferred embodiment of the vibrationally damped spin welding apparatus, the hydraulic power unit (10) may consist of two hydraulic circuits, viz. the first hydraulic circuit may actuate the hydraulic motor for rotating the drive shaft (6) and the second hydraulic circuit may actuate the hydraulic cylinder (17) for driving the linear positioning table (2). Each hydraulic circuit may be supplied by a separate pump; however, both pumps may be mounted on the same shaft driven by a 40 h.p. electric motor. The power circuit can be close-looped, allowing use of a small hydraulic reservoir (17 gallon). The hydraulic circuits can be controlled by solenoid valves and by a variable volume pump serving as the hydraulic power unit (10). The solenoid valves and the variable volume pump can be electrically controlled by an individual at a remote location through leads feeding through the electric junction box. The rotational velocity, the weld pressure, the curing pressure, the advancing or retracting of the linear positioning table (2), and the activation and deactivation of the hydraulic circuits can all be electrically controlled at the remote location.

Futher embodiments of this apparatus are apparent to those skilled in the art of machine design. One manifestation of the apparatus relates to high production rate drum management. Such an apparatus is similar to the apparatus described in the present invention, and consists of a single power unit (10) actuating multiple spin welding assemblies. In this apparatus, the power unit (10) and welding assemblies are mounted on separate frame (1)s, this apparatus allows the platen (8) to be positioned in close proximity to the drums to facilitate their encapsulation. Such an apparatus is estimated to significantly increase production rate at a minimal cost increase over the previously described apparatus.

Method for Spin Welding Heat Fusible Pieces Susceptible to Centrifugal Imbalance A properly performed spin welding technique yields a a high performance circular joint (23) between two heat fusible plastic pieces. The spin welding technique is rapid and eliminates any exposure of the adhesive joints to the air. Other plastic welding techniques, such as butt welding, do not exclude air contact within joint bonding areas. Contact with the air can cause oxidation of the resins and the formation of "skins" which reduce the strength of the joint.

During the spin welding process, a first piece is spun and pressed by a spin welding apparatus while contacting a second piece, being held stationary. While being spun, the first piece is pressed against the second piece with a predetermined welding pressure. The welding pressure and spinning velocity generate frictional heat. The optimal welding pressure and spinning velocity are deteremined for any given application so as to generate sufficient frictional heat to fuse the two heat fusible plastic compositions. The optimal welding pressure and spinning velocity will depend upon the geometry and composition of the particular pieces being welded.

If the first piece is susceptible to a centrifugal imbalance, the spin welding procedure should be performed with a vibrationally damped spin welding apparatus. Pieces having a radius greater than approximately four inches are usually susceptible to a centrifugal imbalance. However, the actual onset of centrifugal imbalance will depend upon the particular geometry of the piece, the precision of its molding process, and upon subsequent modifications.

Centrifugal imbalance arising during the spin welding process is controlled by the vibrational damping means (5) of the spin welding apparatus. The vibrational damping means (5) may include pillow blocks (5) for damping vibrations within the drive shaft (6). The vibrational damping means may also involve the connection between the first piece and the platen (8). The platen (8) includes means for concentrically connecting to the first piece; the first piece includes means for concentrically coupling to the platen (8). If the coupling means (22) and the connecting means (21) take the form of a "template fit," then the concentricity of the connection will be enhanced. An off concentric connection between the platen (8) and the first piece is one cause for centrifugal imbalance. If the "template fit" of the platen (8) connecting means (21) contacts the entire upper surface of the first piece, the connecting means (21) can damp subharmonic vibrations within the first piece resulting from centrifugal imbalance. Subharmonic vibratory motion which is localized to a portion of the first piece can intensify the over all burden of vibration unless it is damped by a platen (8) having a "template fit" which substantially spans and contacts the entire upper surface of the first piece thereby conforming to the contour of the first piece.

A platen (8), which substantially spans and contacts the entire upper surface of the first piece with a "template fit," will also minimize vibrations which arise from asymmetric contact between the first piece and the second piece. If the welding surface of the second piece is not flat or concentrically matched with the first piece, the contact between the first and second pieces can cause vibration. Asymmetric contact between the first and second pieces can cause the first piece to "grab" with a frequency related to the rotational speed. However, such vibration arising from asymmetric interaction with the second piece will be effectively coupled to the pillow blocks (5) and thereby damped if there is a "template fit" between the first piece and the platen (8) which spans and contacts the entire upper surface of the first piece.

The generation of frictional heat by spin welding continues until fused plastic fills the contact space between the first and second pieces. The spinning is then stopped to allow the fused plastic to cure and to form a seamless welded joint (23) between the two pieces. During the curing phase, the contact and the applied pressure between the first and second pieces continues.

The preferred method for operating the preferred vibrationally damped spin welding apparatus, described above, for spin welding a polyethylene overpack, described below, having a receiver (15) with a 26 inch inside diameter and with a welding surface about its perimeter with a ¾ inch width, and the cover (9) having a matching welding surface (24), includes the following suggested operating conditions:

| Processing Parameter | Range of Values |
| --- | --- |
| Rotation Speed | 280–350 rpm |
| Welding Pressure | 75 psig (line pressure) |
|  | 5 psi (weld pressure) |
| Spinning Time | 30–45 seconds |
| Curing Time | 2–7 minutes |
| Cure pressure | 75 psig (line pressure) |
|  | 5 psi (weld pressure) |

Seamless Overpacks

One preferred embodiment for the seamless overpack includes overpacks designed fo managing corroding 55 gallon steel drums holding toxic materials. One objective of this overpack is to adapt cost-effective, commodity plastics and the advantages of rotomolding to the containment of corroding 55 gallon steel drums holding toxic materials. Such overpacks include a cover (9) and a receiver (15). The dimensions of the cover (9) and receiver (15) are based upon two design criteria: encasement of the steel drums and sealing them by the spin welding process. The overpack should have a heat fusible composition. Polyolefins particularly high density and linear low density polyethylene(PE), are preferred compositions for fabricating overpacks. Such materials are well characterized, mass produced, low-in-cost, and provide a unique combination of properties: broad chemical compatibility, corrosion resistance, mechanical resilience, and toughness. Many other resins are also known to be suitable for overpacks, e.g. high impact polypropylene, polyamide, polybutylene, and polyvinylidene difluoride (PVDF) polychlorotrifluoroethylene (PCTFE), and polyethyene cotetrafluoroethylene (CETFE). Additionally, fillers which may be combined with prior art resins which are heat fusible and moldable, as the above, may also be combined with resins for fabricating overpacks. Such resins are suitable to be rotomolded as and spin welded for containing a broad range of waste material.

The cover (9) is circular in shape and has a welding surface (24) proximate to its perimeter. The diameter of the cover (9) is approximately 26 inches. The cover (9) includes coupling means (22) for coupling the cover (9) to the platen (8) of the spin welding device. FIG. 5A illustrates one version of a coupling means (22) wherein rib structures (22), on the top side of the cover (9), which are oriented as spokes and which serve to couple to the platen (8).

The receiver (15) defines a chamber (25) for containing the 55 gallon steel drum. The dimensions of this chamber (25) may be approximately 26 inches inside diameter and 38¼ inches high. Such dimensions would provide space between the outside of the 55 gallon drum and the inside of the overpack to accommodate distorted drums. Such dimensions also allow lagging and/or chemical absorbents to be packed around the drum within the chamber (25). The top of the receiver (15) defines an aperture (26) for providing access into the chamber (25). The diameter of the aperture may correspond with the inside diameter of the chamber (25) so as to enable a 55 gallon drum to be inserted into the chamber (25). Around the perimeter of the aperture is a welding surface (27). The welding surface (27) on the receiver (15) contact the welding surface (24) on the cover (9) during the spin welding process. The two welding surfaces (24 & 27) have widths and diameters which make them substantially superimposable. In this preferred embodiment, the width of the weld surface is approximately ¾ inch, which is approximately three times the recommended wall thickness of the receiver (15). Also, in this preferred embodiment, both welding surfaces (24 & 27) are flat, i.e., the two welding surfaces (24 & 27) are in a plane perpendicular t the axis of rotation of the spin welding apparatus. However, other configurations may also be practicable. The walls of the receiver (15) may be ¼ inch thick. This wall thickness is consistent with the wall thickness of 85 gallon free-standing holding tanks and commercial PE drums. The tare weight of such an overpack would be approximately 45 pounds; in contrast, a steel overpack would weigh approximately 78 pounds.

After the 55 gallon drum is loaded into the chamber (25), the seamless overpack is assembled by spin welding the cover (9) onto the receiver (15). The spin welding operation is facilitated by two features in the overpack design: (1.) the configuration of the welding surface (27) of the receiver (15) and (2.) ribbed structure (22) of the cover (9) which serves to couple the cover (9) to the platen (8). During the spin welding process, the welding surface (27) of the receiver (15) becomes welded to the welding surface (24) of the cover (9). During the spin welding operation, the receiver (15) is placed under the platen (8) and secured by the brace (14) and clamshell clamps (13). The welding surface (27) of the secured receiver (15) is concentric with the platen (8). Then the cover (9) is coupled to the platen (8) and the cover (9) is brought into contact with the receiver (15). The spin welding process is then performed as described above. The spin welding process welds the cover (9) to the receiver (15) so as to hermetically seal the drum within the overpack. The weld (23) resulting from the spin welding process is a seamless weld (23).

Many applications of the seamless overpack require that the overpack meet certain minimum speicifications for wall thickness and wall strength. If an overpack fabricator desires to employ a near minimum amount of material in the fabrication of an overpack, the fabricator will want to use the minimum dimensions for the weld joint which will impart the strength specified by the user. The relevant dimensions to be determined by the fabricator include the radial width of the welding surface (24 & 27) of the receiver (15) and of the cover (9) and the axial thickness of the walls above or below these welding surfaces (24 & 27). The determination of these parameters depends upon consideration arising from the spin welding process.

During the spin welding process, the heat fusible plastic will melt so as to form flash. A portion of this flash can escape from the weld joint during the spinning process. Such flash is thrown from the weld joint by centrifugal force. The loss of flash during the spin welding process causes a diminution of axial wall thickness opposite the welding surfaces (24 & 27) of both the cover (9) and the receiver (15). The measure of lost flash and the resultant diminution of axial wall thickness will depend upon the parameters employed by the operator during the spin welding process and upon the skill of the operator. A skilled operator, using the preferred spin welding apparatus and parameters described above, may typically lose 5-10% of the axial wall thickness opposite the welding surfaces (24 & 27) of the cover (9) and the receiver (15). As a consequence, if an overpack is to be utilized in an application having a minimum specification for wall thickness or wall strength, then the combined axiall wall thickness of unassembled covers (9) and receiver (15) opposite their respective welding surfaces (24 & 27) should be approximately 5-10% thicker, at a minimum under these circumstandes, than the minimum wall thickness required by the specifications for the particular application.

In order to make a spin weld as strong or stronger than the strength of unwelded portions of an overpack, the radial thickness of the weld joint should be greater than the radial thickness of comparable unwelded wall portions of the overpack. In an overpack is to be used in an application requiring a minimum wall strength, the radial width of the welding surfaces (24 & 27) should be greater than the minimum requirement for wall thickness within unwelded wall portions of the overpack. Although weld strengths of spin welded joints are generally excellent, the wall stregnth per unit radial distance through a spin welded joint will not exceed the corresponding wall strength per unit radial thickness of comparable unwelded wall portions of the overpack. The wall strength per unit radial distance of a good weld joint can be approximately 90% of the wall strength per unit radial thickness of comparable unwelded wall portions. As a consequence, the radial width of the welding surfaces (24 & 27) should exceed the user's minimum requirement for wall thickness so as to compensate for the possibly diminished wall strength per unit radial thickness as measured through the weld joint.

The minimum radial width of the weldidng surfaces (24 & 27) should also be adjusted for the fact that a weld may not form in the area proximate to the inside diameter of the welding surface (27). If a receiver (15) is fabricated by a rotomolding process, the inner lip of the welding surface (27) may be round. The portion of the welding surface (27) proximate to the inside diameter of a rotomolded receiver (15) may fail to form a spin weld. After the spin welding process, there may remain a gap between the cover (9) and the receiver (15) proximate to this region. When determining the minimum radial width of the welding surface (24 & 27), a fabricator should consider the possibility that a gap may form proximate to the inside diameter of the welding surface (27).

In order to compensate for both the potentially diminished radial wall strength through a spin weld and the potential formation of a gap proximate to the inside diameter of the welding surface (27), a fabricator of overpacks should provide welding surfaces (24 & 27) having a radial dimension significantly greater than the minimum wall thickness required for the particular application. Since it is usually best to err on th ⓡsafe side, it is usually preferred that the radial width of the welding surfaces (24 & 27) be at least twice the minimum wall thickness required by the particular application.

Certain applications require that the overpack have an enhanced impact resistance. For example, if the overpacks are to be employed for transporting harzardous wastes, the U.S. Department of Transportation may require that loaded overpacks meet a minimum requirement for impact resistance. According to one method, the impact resistance of the overpack may be enhanced by increasing the thicknesses of the receiver (15), the cover (9), and the corresponding welding surfaces (24 & 27), described above. However, this method can become costly due to the extra material employed. In an alternative method, the impact resistance may be increased by employing resins which are known to yield high impact resistant products. Of the various thermoplastic resins suitable for rotomolding the receivers (15) and the covers (9), linear low density polyethylene produces an overpack with a relatively elevated impact resistance.

The impact resistance of overpacks may also be enhanced by fabricating the individual components using a composite rotomolding process (co-rotomolding), wherein a combination of resins are employed, one of which is highly impact resistance and the other being a thermoplastic which is easily spin welded. The resultant receivers (15) and covers (9), fabricated by this co-rotomolding process, have two bonded layers. The outer layer is composed of the highly impact resistant resins and the inner layer, which is bonded to the outer layer, is composed of a thermoplastic resin which may be easily spin welded. In a preferred embodiment, the composition for the outer layer includes a chemically cross-linked polyethylene, which is highly mmpact resistant, and the composition for the inner layer includes a linear low density polyethylene, which is easily spin welded. Although the relative thicknesses of these two layers may vary over a broad range, a typical co-rotomolded overpack for carrying a 55 gallon drum may have a wall thickness which is ⅛ inch for the cross-linked polyethylene and ⅛ inch for the linear low density polyethylene. If the overpack is composite rotomolded for greater impact resistance, the welding surface (24 & 27) should be proportionally enlarged so that they do not represent the weakest point in an impact test. The precise degree of enlargement will depend upon the composition and thickness of the outer layer, i.e. the impact resistant layer.

EXAMPLES AND TESTS

The following examples are presented to illustrate various features of the inventions:

Polyethylene overpacks for containing 55 gallon steel drums were fabricated from parts prepared by rotomolding ARCO 5440 resin, a high-density polyethylene resin with a melt index of 4.0. The diameter of the cover was 26 inches. The weld pressure at the weld surface was 5 psi. A first overpack was spin welded with a rotational velocity of 350 rpm maintained for a period of 35 sec. The weld was then cured under a pressure of 5 psi for 4 minutes. A second and third overpack were spin welded with a rotational velocity of 200 rpm maintained for a period of 20 seconds. The weld was then cured under a pressure of 5 psi for 2 minutes. The composition of the cover of the second and third overpacks included 2% carbon black. The composition of the receiver of the second overpack also included 2% carbon black. The addition of carbon black renders overpacks stable to UV-radiation.

Tests on the welded overpacks showed that they were watertight. A hydrostatic burst test showed that the welded polyethylene overpacks were stronger than standard 80 gallon steel drums. Overpacks withstood an average of 17.75 psi, equivalent to a burst load of 9408 lbs. In contrast, standard 80 gallon steel drums are rated to 15.0 psi. The polyethylene overpacks subjected to the burst test did not fail at their spin welded interface.

Sections of the spin weld were subjected to tensile testing and test specimens were examined visually and micrographically. Tensile pulls on sections of the spin weld showed that failure occurred consistantly and without exception at the toe of the weld and not at the interface. Spin welding achieves high strength joints.

Thin cross sections of the weld were examined by preparing transmission optical micrographs. Examination of a 5× magnification micrograph of a thin section of the welded joint fabricated in the first example showed the welded joint to be a continuous and void-free cohesive bond. The width of the welded joint measured $2\frac{1}{2}$ times greater than the wall thickness of the overpack. No distinct weld line was observed, indicating that good wet-out and thorough mixing of the molten materials were obtained prior to solidification. Examination of a 50× magnification micrograph of a thin section of the welded joint fabricated in the third example, in which the cover is composed of the natural white material and the receiver is composed of the 2% carbon black material, showed that the interface of the welded joint was formed by a gradual and homogeneous mix of each parent material. The thickness of the interfacial region spanning the receiver and the cover was approximately 560 microns. Moreover, no "hairline" or discontinuity of material was observed between the joined materials. Examination of a 100× magnification scanning electron micrograph (SEM) of the welded joint of the third example shows that there was no discernable difference in the surface morphologies of the interface and the parent materials. Such a welded joint is termed seamless. The examples and test results indicate that spin welded joints are seamless, i.e. the interface of such joints have uniform surface morphology with the parent materials and lack any discontinuity or "hairline." Such seamless joints are differentiated from heat-seams and butt-welds which are not seamless. The advanced mechanical performance exhibited in the hydrostatic and tensile tests described above may have been due to the formation of seamless welded joints, i.e., joints characterized as cohesive bonds having large, homogeneous interfaces.

What is claimed is:

1. In an improved method for spin welding a first work piece to a second work piece, the first work piece having a perimeter, a first heat fusible plastic composition, and a first welding surface proximate to the perimeter, the second work piece having a second heat fusible plastic composition and a second welding surface, the method of the type which includes the following steps:

Step (1): rotating the first work piece by means of a platen concentrically connected to a rotating drive shaft having a substantially vertical orientation, Step (2): holding the second workpiece stationary, Step (3): pressing the rotating first work piece against the stationary second work piece for generating frictional heat for melting the first and second welding surfaces, then Step (4): arresting the rotation of said Step 1, and then, Step (5): pressing the first work piece against the second work piece for curing and welding the first welding surface to the second welding surface, the improvement for enabling the spin welding of the first work piece to the second work piece when the first work piece is susceptible to a centrifugal imbalance during said Step (1), the improvement comprising the following additional steps, each performed simultaneously with said Step (3):

(a) Step (3.1): reducing vibrational coupling between the first and second work pieces by employing first and second welding surfaces which are substantially planar and (b) Step (3.2): damping the centrifugal imbalance of the first work piece by vibrationally coupling the first work piece with the platen and vibrationally coupling the drive shaft with a pillow block, wherein in said Steps (3.2) and (5); the platen having a template fit which substantially spans and conforms to the contour of the upper surface of the first work piece for damping centrifugal imbalance in said Step (3.2) and for curing welding the first and second welding surfaces in said Step (5).

2. In an improved method for spin welding as described in claim 1 wherein the first work piece is a cover and the second work piece is a receiver, the receiver defining a chamber for containing an isolate and a circular aperture for providing access to the chamber, the improvement further comprising the following additional step:

(a) Step (0.1): prior to step (1), placing the isolate into the chamber.

3. In an improved method for spin welding as described in claim 2, the improvement wherein:

in said Step (3), the platen being translatable by means of a linear positioning table onto which is mounted the pillow block for pressing the first welding surface against the second welding surface while damping the centrifugal imbalance of the first work piece.

4. In an improved spin welding apparatus for spin welding a first work piece onto a second work piece, the first work piece having an upper surface, a first heat fusible plastic composition, and a first welding surface, the second work piece having a second heat fusible plastic composition and a second welding surface, the spin welding apparatus of the type which includes:

a platen for rotationally driving and exerting downward pressure upon the first work piece, a drive shaft having an upper end and a lower end, the lower end of the drive shaft being concentrically attached to the platen for rotating the platen, and a means for supplying torque to the drive shaft, the torque means being attached to the upper end of the drive shaft, the improvement for enabling the spin welding of the first work piece when the first work piece is susceptible to a centrifugal imbalance, the improvement comprising:

(a) a pillow block coupled to the drive shaft between the platen and the torque means for vibrationally damping the drive shaft and controlling the centrifugal suspectibility of the first work piece during the spin welding process and (b) the platen having a template fit with the upper surface of the first work piece, the template fit substantially spanning and conforming to the contour of the upper surface of the first work piece for exerting downward pressure upon the first work piece and for reducing and damping the centrifugal imbalance of the first work piece by vibrationally coupling the first work piece with the drive shaft and the pillow block when spin welding the first welding surface onto the second welding surface.

5. In an improved spin welding apparatus as described in claim 4, the improvement wherein:
   (a) the platen having a diameter substantially greater than four inches.

6. In a improved spin welding apparatus as described in claim 4, wherein the spin welding apparatus being of the type which further includes:
   a frame, the improvement further comprising:
   (a) a linear positioning table to which are attached the torque means and said pillow block,
   (b) a means for slideably hanging the linear positioning table vertically from the frame, said slidable hanging means being anchored to the frame and attached to said linear positioning table for hanging said linear positioning table and sliding said linear postioning table vertically,
   (c) a means for driving said linear positioning table along said slidable hanging means, said driving means anchored to the frame and attached to said linear positioning table along said slidable hanging means for vertically translating the torque means, the drive shaft, and the platen and for exerting pressure upon the first work piece through the platen for spin welding the first work piece to the second work piece, and
   (d) a means for holding the second work piece stationary, said holding means being anchored to the frame.

* * * * *